United States Patent [19]

Fine et al.

[11] Patent Number: 5,084,328
[45] Date of Patent: Jan. 28, 1992

[54] STRONG, SURFACE CRYSTALLIZED GLASS ARTICLES

[75] Inventors: Gerald J. Fine; Margaret E. Greene, both of Corning, N.Y.

[73] Assignee: Corning Incorporated, Corning, N.Y.

[21] Appl. No.: 632,935

[22] Filed: Dec. 24, 1990

[51] Int. Cl.$^5$ ............................................. B32B 17/06
[52] U.S. Cl. ................................. 428/212; 428/334; 428/409; 428/410; 428/426; 428/428; 428/697; 428/699; 428/701
[58] Field of Search ............... 428/409, 410, 426, 428, 428/212, 334, 697, 699, 701; 501/68, 69

[56] References Cited

U.S. PATENT DOCUMENTS

| | | | |
|---|---|---|---|
| 2,998,675 | 9/1961 | Olcott | 428/410 |
| 3,252,811 | 5/1966 | Beall | 501/69 |
| 3,253,975 | 5/1966 | Olcott | 428/410 |
| 3,380,818 | 4/1968 | Smith | 501/69 |
| 3,490,984 | 1/1970 | Petticrew et al. | 428/410 |
| 3,754,881 | 8/1973 | Petticrew | 501/69 |
| 3,779,856 | 12/1973 | Pirooz | 428/410 |
| 3,840,394 | 10/1974 | Eppler | 501/69 |
| 3,907,577 | 9/1975 | Kiefer et al. | 501/69 |
| 3,926,602 | 12/1975 | Andrus et al. | 501/68 |
| 3,931,438 | 1/1976 | Beall et al. | 428/428 |
| 3,951,670 | 4/1976 | Bush | 501/69 |
| 3,998,617 | 12/1976 | Gliemeroth | 501/69 |
| 4,022,627 | 5/1977 | Tashiro et al. | 501/69 |
| 4,057,434 | 11/1977 | Rittler | 501/69 |
| 4,074,992 | 2/1978 | Voss | 501/69 |
| 4,074,993 | 2/1978 | Ackerman et al. | 501/69 |
| 4,172,921 | 10/1979 | Kiefer | 428/410 |
| 4,218,512 | 8/1980 | Allersma | 428/410 |
| 4,461,839 | 7/1984 | Rittler | 501/68 |
| 4,726,981 | 2/1988 | Pierson et al. | 428/428 |
| 4,814,297 | 3/1989 | Beall et al. | 501/68 |

FOREIGN PATENT DOCUMENTS 1108473  4/1968  United Kingdom.
1322746  7/1973  United Kingdom.

Primary Examiner—Robinson, Ellis P.
Assistant Examiner—Archene A. Turner
Attorney, Agent, or Firm—C. S. Janes, Jr.

[57] ABSTRACT

This invention is directed to the formation of transparent, surface-crystallized glass bodies exhibiting very high mechanical strengths, but low frangibility, consisting essentially, in weight percent, of 2.5–5.0% $Li_2O$, 5–10% $MgO$, 3.5–12% $ZnO$, 16–28% $Al_2O_3$, and 50–70% $SiO_2$.

2 Claims, No Drawings

STRONG, SURFACE CRYSTALLIZED GLASS ARTICLES

BACKGROUND OF THE INVENTION

The concept of producing a strong, abrasion resistant glass body by developing a thin, crystalline, compressive stress layer in situ thereon by subjecting the glass body to a particularly-defined heat treatment was first described in U.S. Pat. No. 2,998,675 (Olcott et al.). That patent disclosed glass compositions comprising, in parts by weight, 65–72 $SiO_2$, at least 4 $Li_2O$, 22.5–30 $Al_2O_3$, the weight ratio $Li_2O:Al_2O_3$ being no greater than 0.3:1, and at least one crystallization catalyst selected from the group 0.1–3.5 $TiO_2$, 0.1–5 $B_2O_3$, 0.4–2 $Na_2O$, and 0.5–10 PbO. The patent prescribed exposing the glass body for times ranging from one hour at a temperature equivalent to a glass viscosity of $10^7$ poises to 40 hours at a temperature equivalent to a glass viscosity of $10^{10}$ poises. Those temperatures were indicated as ranging from a high of about 870° C. to a low of about 750° C. The crystals generated in the surface layer were stated to be of $\beta$-eucryptite which exhibited a lower linear coefficient of thermal expansion than that of the interior glass. Their presence, in turn, reduced the overall coefficient of thermal expansion of the surface layer relative to that of the interior glass, resulting in a uniform compressive stress in and parallel to the surface of the glass article after it is cooled. The establishment of that surface layer imparted greatly enhanced mechanical strength to the glass article.

A second early description of forming such articles can be found in U.S. Pat. No. 3,253,975 (Olcott et al.). Method steps, temperatures, and times similar to those disclosed in U.S. Pat. No. 2,998,675 were employed, but the glass compositions comprised, in parts by weight, 52–65 $SiO_2$, at least 4 $Li_2O$, and not over 40 $Al_2O_3$, with the weight ratio $Li_2O:Al_2O_3$ being no greater than 0.3:1. Other compatible oxides were permitted in limited amounts, but none was required. $\beta$-eucryptite crystals were again generated in the surface to provide a compression layer.

Another early disclosure of producing such articles is provided in U.S. Pat. No. 3,490,984 (Petticrew et al.) wherein the base glass composition consisted essentially, in weight percent, of 2–4% $Li_2O$, 2–10% MgO, 10–20% $Al_2O_3$, and 60–75% $SiO_2$, with at least one member of the group of 0–3% $ZrO_2$, 0–1.5% $TiO_2$, and 0–2% $SnO_2$. Upon heat treatment at temperatures in the vicinity of the softening point of the glass (a glass viscosity of $10^{7.65}$ poises), a thin surface compression layer was generated containing $\beta$-eucryptite-like and/or $\beta$-spodumene-like crystals.

British Patent Specifications Nos. 1,108,473 and 1,108,476 also describe glass bodies having surface compression layers containing crystals. Both patents disclose glass compositions which consisted, in weight percent, of 24–56% ZnO, 3–25% $Al_2O_3$, and 32–54% $SiO_2$. The preferred compositions contained a nucleating agent selected from the group of 0.5–6% $P_2O_5$, 0.5–4% $MoO_3$, and 1.5–7.5% $ZrO_2$. Upon heat treatment willemite crystals provide an opaque or opalescent surface layer.

British Patent Specification No. 1,322,796 discloses a modification in the method described in the above two British patents for producing glass bodies having crystal-containing, surface compression layers. The glass compositions were similar to the earlier bodies and the modification in method comprises abrading the surface of the glass body prior to exposing it to a heat treatment. The prior surface abrasion was stated to both improve the strength of the final product and the transparency thereof.

U.S. Pat. No. 4,814,297 (Beall et al.) discloses yet another glass body having a surface compression layer, this layer containing microscopic-sized crystals of $\beta$-eucryptite and/or $\beta$-quartz solid solution. The thrust of that disclosure was to produce transparent, essentially haze-free bodies through a particularly designed heat treatment of glasses consisting essentially, in weight percent, of 5–7% $Li_2O$, 0–2% $Na_2O$, 0–10% ZnO, 22–28% $Al_2O_3$, and 55–67% $SiO_2$, the molar ratio $R_2O+RO:Al_2O_3>1$ and the molar ratio $SiO_2:Al_2O_3 \approx 4$. The preferred glasses contain at least 1% ZnO and, most preferably, contain 4–8% ZnO. The heat treatment contemplates first heating the glass to 650°–850° C. for a sufficient length of time to develop nuclei in a thin surface layer on the glass, and thereafter further heating the surface nucleated glass in the range of 650°–850° C. for a period of time up to two hours to grow the desired crystals on the nuclei. Beall et al. referred to the earlier Olcott et al. patents discussed above, noting that their surface crystallized glass bodies were essentially haze-free, whereas the products of the earlier patents exhibited haze. Beall et al. explained that the essential absence of haze in their products was due to the very small size of the surface crystals developed in their products, resulting from the very rapid nucleation of their glasses because of the generally lower levels of $Li_2O$ and $Al_2O_3$ therein as compared to the Olcott et al. glasses.

As can be seen from the above disclosures, research has been quite extensive to develop high strength, transparent, surface-crystallized glass articles, wherein the crystals exhibit a lower coefficient of thermal expansion than that of the glass, thereby producing an integral surface layer of compressive stresses on the article. Surprisingly, however, commercial marketing of such articles has been minimal. Three factors have been defined to explain this lack of commercial success:

First, the development of excessive internal tension in the glass is hazarded which can result in forceful fragmentation upon fracture of the articles, such forceful fragmentation being termed frangibility;

Second, delayed and, hence, unpredictable breakage of the articles has been experienced; and Third, whereas the articles demonstrate high unabraded mechanical strengths, the layers of crystals have commonly been quite thin, viz., about 10 microns in thickness, such that this strength is dramatically reduced when the surface is subjected to even minimal physical abuse.

Accordingly, the primary objective of the present invention was to devise compositions for glass articles upon which, when heat treated, an integral crystalline surface compression layer can be generated, said articles exhibiting high strength, virtually haze-free transparency, and relatively gentle fragmentation upon fracture, and said surface layer being of sufficient thickness to essentially eliminate delayed breakage of the articles.

SUMMARY OF THE INVENTION

The magnitude of surface compression/internal tension present in a two-layer, laminated structure is influenced by such factors as the thickness, the Young's modulus, and Poisson's ratio of the layers, and the total strain in the laminate. This last factor is determined by the mismatch in thermal expansion from the set point of the glass to room temperature existing between the surface layer and the inner portion of the body. Laboratory experimentation and field testing have indicated that a surface crystallized layer having a minimum thickness of at least 30 microns is required to provide substantial assurance against delayed breakage. Therefore, inasmuch as a relatively thick surface layer is demanded and it was posited that the ranges of Young's moduli and Poisson's ratios of the crystallizable glasses would not be great, research was initiated to study modifications in glass compositions which could lead to means for controlling the extent of thermal expansion mismatch between the crystallized surface layer and the interior glass. Thus, an investigation of the glasses strengthened via surface crystallization as disclosed in U.S. Pat. No. 4,814,297 indicated that the thermal expansion mismatch (25°–300° C.) existing between the surface compression layer and the interior glass portion averaged about $50 \times 10^{-7}/°$ C. In contrast, to assure gentle fragmentation upon fracture, the thermal expansion mismatch between the surface layer and the core portion of the laminated dinnerware products marketed by Corning Incorporated, Corning, N.Y. under the trademark CORELLE is maintained below $25 \times 10^{-7}/°$ C. Accordingly, the goal of the present research was to devise glass compositions which, when heat treated, would form articles having an integral crystalline surface compression layer wherein the thermal expansion mismatch (25°–300° C.) between the surface layer and the interior portion would be between about 5–$25 \times 10^{-7}/°$ C., typically between 10–$15 \times 10^{-7}/°$ C. (A thermal expansion mismatch of less than $5 \times 10^{-7}/°$ C. does not impart any substantial improvement in mechanical strength to the glass articles.)

We found the following two parameters to be important in assuring transparency of high clarity in the final products:

(1) The differences in refractive index between the glass and the crystals should be minimized.

(2) The birefringence of the crystals should be low. The birefringence of β-quartz solid solution crystals is intrinsically low, reaching a minimum at about 70% by weight $SiO_2$. It will be appreciated, of course, that transparent articles can result where the crystals contained therein have dimensions so small as to approach the wavelengths of visible light. However, such articles have not been produced in surface-nucleated, thick-skinned bodies.

One very practical criterion which the glasses must exhibit is the ability of the surface to crystallize at temperatures sufficiently low to avoid thermal deformation. Most preferably, the glass surface will crystallize quite rapidly such that long heat treatments, self-evidently increasing the hazard of thermal deformation, will not be required.

Because a variety of glass forming components may be incorporated into β-quartz solid solution, e.g., MgO and ZnO, the crystals can display a rather wide range of thermal expansion. Laboratory investigations have demonstrated that the linear coefficient of thermal expansion of the $SiO_2$ end member of the β-quartz solid solution is approximately $-5 \times 10^{-7}/°$ C. The scientific literature has recorded that the addition of $LiAlO_2$ can lower the coefficient still further, whereas the addition of $Mg(AlO_2)_2$ can raise the coefficient to as high as $45 \times 10^{-7}/°$ C. By comparison, the addition of $Li_2ZnO_2$ appears to exert no substantial effect upon the coefficient. In contrast, we have learned that additions of MgO and/or ZnO tend to reduce the coefficient of thermal expansion of alumino-silicate glasses. In view of those factors, we initiated a research program to discover whether it might be possible to develop glasses in the $Li_2O$-MgO-ZnO-$Al_2O_3$-$SiO_2$ system which exhibit lower coefficients of thermal expansion than the glasses disclosed in U.S. Pat. No. 4,814,297, but which would crystallize microscopic-sized β-quartz solid solution crystals with higher coefficients of thermal expansion, thereby producing strong glass articles with lower internal tension and, hence, low frangibility.

That program led us to a very narrow composition interval within the $Li_2O$-MgO-ZnO-$Al_2O_3$-$SiO_2$ field which yields transparent glass articles of high clarity and high mechanical strength having an integral crystalline surface compression layer with a thickness of at least 30 microns, wherein the crystals consist essentially solely of β-quartz solid solution, the articles demonstrating relatively gentle fragmentation upon fracture because the difference in coefficient of thermal expansion between the surface layer and the inner glass is between about 5–$25 \times 10^{-7}/°$ C., and being virtually free from delayed breakage. Thus, the inventive compositions consist essentially, expressed in terms of weight percent on the oxide basis, of about 2.5–5.0% $Li_2O$, 5–10% MgO, 3.5–12% ZnO, 16–28% $Al_2O_3$, and 50–70% $SiO_2$. In general, the minimum temperatures operable for crystallizing the thick surface layer correspond to a glass viscosity varying about $10^{9.5}$–$10^{10}$ poises (glass softening point = $10^{7.65}$ poises). As will be appreciated, crystallization occurs more rapidly as the temperature is raised. But again, as will be appreciated, as the temperature more closely approaches the glass softening point, the problem of thermal deformation becomes greater and formers or other supporting members will be required to maintain the geometry of the article. We have found crystallization temperatures between about 750°–875° C. to be operable, with 775°–850° C. being preferred. At temperatures below about 750° C. the rate of crystallization is so slow as to be impractical from a commercial production point of view. At temperatures above 850° C. not only is thermal deformation a serious problem, but also crystallization occurs so rapidly that the full cross section of the article becomes crystallized as the surface layer is formed.

The morphology of the crystals developed throughout the inventive range of glass compositions appears remarkably similar. Hence, blocky, subhedral to anhedral crystals are linearly oriented inwardly from the glass surface. The nucleation sites for all of the crystal layers appear to be on the surface; there is no evidence of internal nucleation of any phase. Crystal density, i.e., the number of nucleation sites on the surface, is generally quite uniform and does not vary significantly over the composition or heat treatment temperature ranges. There may, perhaps, be a slightly higher density of crystals where the glass article is initially subjected to a nucleating step at a temperature below 750° C. and then exposed to the crystallization heat treatment. As observed earlier, crystallization proceeds more rapidly at higher temperatures. Accordingly, at temperatures approaching the hotter extreme of the crystallization range, an exposure period of no more than about 0.25 hour may be adequate to generate a surface crystallized layer having a thickness of at least 30 microns, whereas at 750° C. it may require eight hours or even longer.

In summary, the present invention is directed to the production of transparent, essentially haze-free articles demonstrating virtual freedom from delayed breakage, flexural strengths in excess of about 40 Kpsi, but with low frangibility, comprising a glass body having an integral crystalline surface compression layer having a thickness of at least 30 microns containing microscopic-sized crystals of $\beta$-quartz solid solution and exhibiting a linear coefficient of thermal expansion (25°–300° C.) between about $5-25 \times 10^{-7}/°$ C. lower than that of the glass body, the composition of the article being essentially constant throughout and consisting essentially, expressed in terms of weight percent on the oxide basis, of 2.5–5.0% $Li_2O$, 5–10% MgO, 3.5–12% ZnO, 16–28% $Al_2O_3$, and 50–70% $SiO_2$. Preferred compositions consist essentially of 2.5–4.5% $Li_2O$, 6–10% MgO, 6.5–12% ZnO, 17–26% $Al_2O_3$, and 56–64% $SiO_2$.

DESCRIPTION OF PREFERRED EMBODIMENTS

Table I records a group of glass compositions, expressed in terms of parts by weight on the oxide basis, illustrating the parameters of the present invention. Because the sum of the individual components totals or closely approximates 100, for all practical purposes the values listed in Table I may be deemed to represent weight percent. The actual batch ingredients may be any materials, either oxides or other compounds, which, when melted together, will be converted into the desired oxides in the proper proportions. For example, $LiAlO_2$ may comprise a source of $Li_2O$ and $Al_2O_3$ and and $LiZnO_2$ may constitute a source of $Li_2O$ and ZnO.

The batch ingredients were compounded, ballmilled or tumbled together to assist in achieving a homogeneous melt, and then charged into platinum crucibles. The crucibles were introduced into a furnace operating at about 1600° C. and the batches melted overnight with stirring. The melts were poured into steel molds to yield glass slabs having the approximate dimensions of about $5'' \times 5'' \times 0.5''$, and those slabs were transferred immediately to an annealer operating at about 600°–650° C. Glass cane was also hand drawn from the melts, the cane typically having a diameter of about 0.2'', although canes of other diameters were also drawn.

It will be appreciated that, whereas the above description reflects laboratory scale melting only, the recited glasses are capable of being produced in large scale, commercial melting units.

Samples were cut from the annealed slabs to be used for the determination of such physical properties as softening points (S.P.), annealing points (A.P.), and strain points (St.P.) in terms of ° C., and linear coefficients of thermal expansion over the temperature range 25°–300° C. (Exp.) in terms of $\times 10^{-7}/°$ C. The results of those measurements are also reported below in Table I.

TABLE I

|  | 1 | 2 | 3 | 4 | 5 | 6 | 7 |
|---|---|---|---|---|---|---|---|
| $SiO_2$ | 60.0 | 60.0 | 60.0 | 60.0 | 60.0 | 60.0 | 60.0 |
| $Al_2O_3$ | 21.5 | 17.9 | 21.8 | 21.6 | 25.4 | 25.5 | 25.6 |
| $Li_2O$ | 2.7 | 4.0 | 3.8 | 3.3 | 2.4 | 3.0 | 3.6 |
| MgO | 8.5 | 7.1 | 7.1 | 7.8 | 8.5 | 7.8 | 7.1 |
| ZnO | 7.3 | 11.0 | 7.3 | 7.3 | 3.7 | 7.3 | 3.7 |
| S.P. | 852 | 764 | 848 | 851 | 912 | 887 | 867 |
| A.P. | 625 | 615 | 642 | 656 | — | 690 | 674 |
| St.P. | 606 | 576 | 600 | 614 | — | 648 | 632 |

TABLE I-continued

| Exp. | 41 | 49 | 46 | 44 | 38 | 42 | 45 |
|---|---|---|---|---|---|---|---|
|  | 8 | 9 | 10 | 11 | 12 | 13 |  |
| $SiO_2$ | 60.0 | 60.0 | 50.0 | 70.0 | 50.0 | 61.0 |  |
| $Al_2O_3$ | 21.8 | 21.8 | 27.2 | 16.3 | 27.1 | 21.8 |  |
| $Li_2O$ | 2.8 | 2.8 | 4.8 | 2.9 | 4.1 | 2.8 |  |
| MgO | 8.1 | 8.1 | 8.9 | 5.3 | 9.7 | 7.1 |  |
| ZnO | 7.3 | 8.3 | 9.1 | 5.5 | 9.1 | 7.3 |  |
| S.P. | 862 | 862 | 794 | Cryst* | 816 | 872 |  |
| A.P. | 666 | 665 | 621 | 674 | 635 | 669 |  |
| St.P. | 623 | 622 | 583 | 629 | 597 | 626 |  |
| Exp. | 42 | 42 | 54 | 39 | 51 | 41 |  |

*Crystallized

The canes hand drawn from Examples 1–13 were used for measurements of moduli of rupture (MOR) in terms of Kpsi, and 4'' ($\approx 10.2$ cm) diameter discs were cut from the annealed slabs and then ground and polished to a thickness of 0.1'' ($\approx 0.25$ cm) for use in measuring impact strengths and forces of fragmentation.

The determination of impact strengths involved dropping a 0.5 kg steel ball onto the disc, the surface of which was first hand abraded with 150 grit abrasive paper to simulate physical abuse which the glass articles would likely experience in service. The maximum height from which the ball could be dropped before disc breakage comprised a gauge of its impact strength.

A qualitative test was devised for estimating the force of fragmentation exhibited by the articles upon breakage. This test involved fracturing the disc through the point of a center punch applied to the middle of the disc. Where fewer than 12 pieces resulted from the breakage, the force of fragmentation was deemed to be sufficiently gentle to permit the ware to be suitable for consumer applications.

The samples from each of the glasses listed in Table I were placed in an electrically-heated furnace and the temperature therein raised at about 150° C./hour to a particular temperature and held at that temperature for a predetermined period. Thereafter, the samples were withdrawn from the furnace and allowed to cool in the ambient environment to room temperature. Table II records the temperature and time to which each sample was heat treated. Table II also reports an average modulus of rupture (MOR), expressed in terms of Kpsi, utilizing 6–12 samples, an average break height for impact strength (IS), expressed in terms of inches, utilizing 4 samples, the depth of the surface crystalline layer (D) as viewed microscopically through a cross section of the hand drawn cane or ground sheet, expressed in terms of microns, the linear coefficient of thermal expansion of the surface crystalline layer (Exp.S), expressed in terms of $\times 10^{-7}/°$ C., the difference between the linear coefficient of thermal expansion of the interior (original) glass (Exp.I), and that of the surface crystalline layer, and the number of pieces (P) resulting from the center punch test.

TABLE II

| Example | Heat Treat °C. | Hours | MOR | D | IS | Exp.S | Exp.I-Exp.S | P |
|---|---|---|---|---|---|---|---|---|
| 1 | 800° | 2 | 42 | — | 9 | 34 | 7 | — |
|  | 800° | 4 | 67 | 30 | 10 | 34 | 7 | 6 |
|  | 800° | 6 | 71 | — | 10 | 34 | 7 | 11 |
| 2 | 800° | 4 | — | 100 | 7 | 25 | 24 | 6 |
| 3 | 800° | 2 | 87 | 75 | 14 | 26 | 20 | 12 |
| 4 | 800° | 4 | 79 | 50 | 13 | 30 | 14 | 9 |
| 5 | 800° | 2 | 52 | 30 | 5 | 30 | 8 | 10 |
| 6 | 850° | 2 | 54 | 75 | 5 | 26 | 16 | 4 |

TABLE II-continued

| Example | Heat Treat °C. | Hours | MOR | D | IS | Exp.S | Exp.I-Exp.S | P |
|---|---|---|---|---|---|---|---|---|
| 7 | 850° | 2 | 60 | 80 | 8 | 22 | 23 | 4 |
| 8 | 800° | 6 | 60 | 30 | 7 | — | — | 12 |
| 9 | 800° | 6 | 75 | 100 | 9 | — | — | 12 |
| 10 | 800° | 6 | 66 | 150 | 4 | 33 | 21 | 5 |
| 11 | 850° | 2 | 41 | 40 | 3 | 15 | 24 | 10 |
| 12 | 850° | 2 | 58 | 70 | 6 | 38 | 13 | 2 |
| 13 | 800° | 7 | 73 | 30 | 10 | — | — | 9 |

Table III records a group of comparison glass compositions, expressed in terms of parts by weight on the oxide basis, prepared in like manner to the glasses of Table I. Thus, the glasses have compositions slightly outside of the ranges required to produce articles exhibiting the desired physical properties. Glass cane was hand drawn and a slab molded from each crucible melt. Samples of cane and discs from the slabs were subjected to the tests described above for the glasses of Table I. The properties measured on those glasses are also reported in Table III.

Finally, samples from each of the glasses were heat treated in accordance with the procedure followed with Examples 1–13; an exposure for 2 hours at 850° C. Table III lists the failing observed in each of the examples.

TABLE III

|  | 14 | 15 | 16 | 17 | 18 | 19 | 20 |
|---|---|---|---|---|---|---|---|
| $SiO_2$ | 60.0 | 60.0 | 60.0 | 60.0 | 60.0 | 60.0 | 50.0 |
| $Al_2O_3$ | 22.0 | 25.2 | 21.8 | 21.8 | 21.8 | 21.8 | 26.9 |
| $Li_2O$ | 5.1 | 1.9 | 1.8 | 0.8 | 1.8 | 0.8 | 3.1 |
| MgO | 5.7 | 9.2 | 9.1 | 10.1 | 7.1 | 7.1 | 10.6 |
| ZnO | 7.3 | 3.7 | 7.3 | 7.3 | 9.3 | 10.3 | 9.1 |
| S.P. | — | — | 888 | 923 | Cryst* | 922 | 822 |
| A.P. | — | — | 691 | 727 | 690 | 721 | 648 |
| St.P. | — | — | 648 | 684 | 645 | 678 | 610 |
| Exp. | 51 | 37 | 37 | 34 | 37 | 32 | 48 |
| Failing | Frangible | Weak | Weak | No Surface Cryst* | Weak | Weak | No Surface Cryst* |

The most preferred composition is Example 1.

We claim:

1. A transparent, essentially haze-free article demonstrating virtual freedom from delayed breakage, flexural strength in excess of 40 Kpsi, but with low frangibility, comprising a glass body having an integral crystalline surface compression layer having a thickness of at least 30 microns containing microscopic-sized crystals of β-quartz solid solution and exhibiting a linear coefficient of thermal expansion between $5-25 \times 10^{-7}/°$ C. lower than that of the glass body, the composition of the article being essentially constant throughout and consisting essentially, expressed in terms of weight percent on the oxide basis, of 2.5–5.0% $Li_2O$, 5–10% MgO, 3.5–12% ZnO, 16–28% $Al_2O_3$, and 50–70% $SiO_2$.

2. A transparent, essentially haze-free article according to claim 1 consisting essentially of 2.5–4.5% $Li_2O$, 6–10% MgO, 6.5–12% ZnO, 17–26% $Al_2O_3$, and 56–64% $SiO_2$.

* * * * *